United States Patent [19]

Pippin et al.

[11] Patent Number: 5,407,317

[45] Date of Patent: * Apr. 18, 1995

[54] VACUUM BEAM PRODUCT DISPENSER AND SINGULATOR AND METHOD FOR SINGULATING PRODUCTS

[75] Inventors: James M. Pippin, Keller; Son T. Hoang, Garland; Richard C. Hickey, Plano, all of Tex.

[73] Assignee: ElectroCom Automation, L.P., Arlington, Tex.

[*] Notice: The portion of the term of this patent subsequent to Aug. 17, 2010 has been disclaimed.

[21] Appl. No.: 226,076

[22] Filed: Apr. 11, 1994

Related U.S. Application Data

[63] Continuation of Ser. No. 2,664, Jan. 29, 1993, Pat. No. 5,326,219.

[51] Int. Cl.⁶ .......................... B65G 59/06; B65H 3/12
[52] U.S. Cl. ..................... 414/797.6; 186/52; 198/803.5; 221/211; 271/12; 271/35; 271/99
[58] Field of Search ............ 186/52, 55; 198/453, 198/471.1, 803.5; 221/123, 129, 131, 133, 211; 271/12, 35, 94, 99, 103, 202, 260, 273; 414/797.4, 797.6, 797.7, 797.8

[56] References Cited

U.S. PATENT DOCUMENTS 5,064,341 11/1991 Pippin ..................... 414/797.6

OTHER PUBLICATIONS

This reference was cited by applicants in the prosecution of patent application Ser. No. 08/002,664.

Primary Examiner—Michael S. Huppert
Assistant Examiner—Janice L. Krizek
Attorney, Agent, or Firm—Harold E. Meier

[57] ABSTRACT

A vacuum beam product dispenser and singulator to dispense and singulate "soft" products in an automated order dispensing system (AOS) includes a product cartridge and an inclined conveyor belt. The conveyor belt picks the products from the bottom of the cartridge using a vacuum control element and carries it up the conveyor until it reaches a pinch roller that holds the product ready to be dispensed to a central conveyor of the AOS. Products are picked from the product cartridge by the inclined conveyor in a position such that a product will fall off the conveyor unless held by a vacuum generated by the vacuum control element. Thus, random multiples removed from the cartridge with the picked product fall off the conveyor. The product stream from the hopper is thereby singulated.

21 Claims, 8 Drawing Sheets

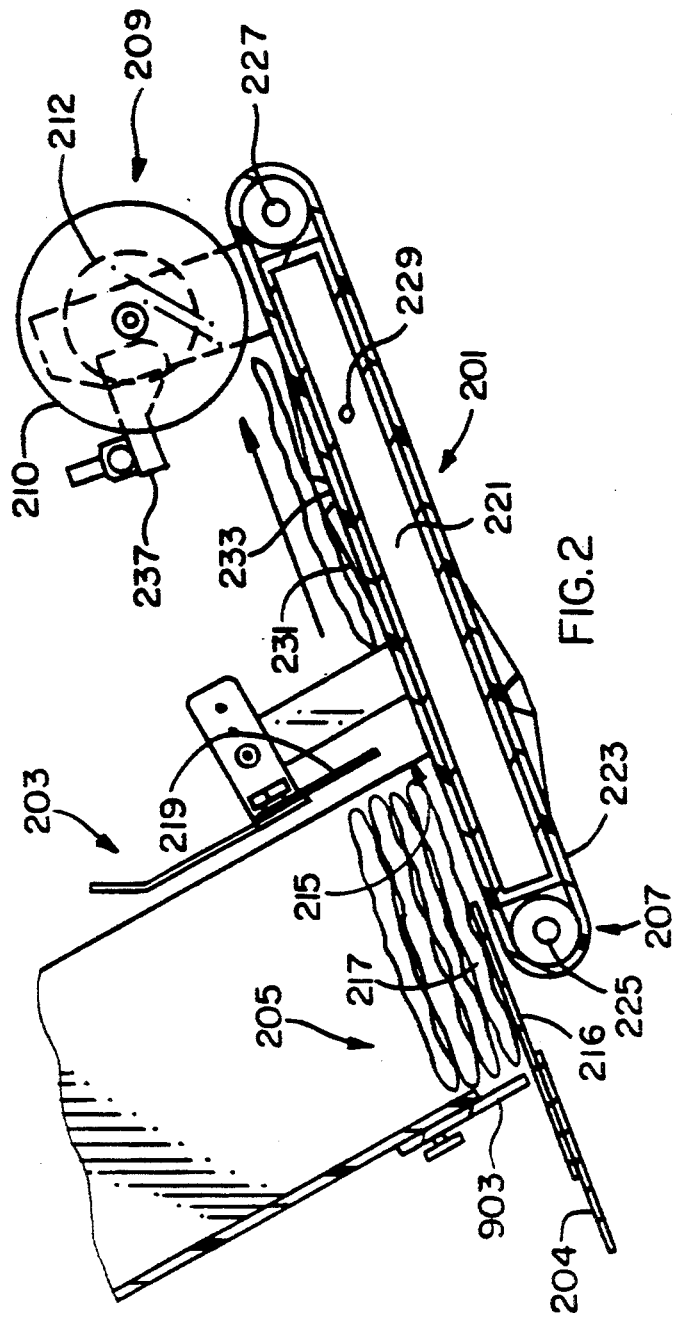
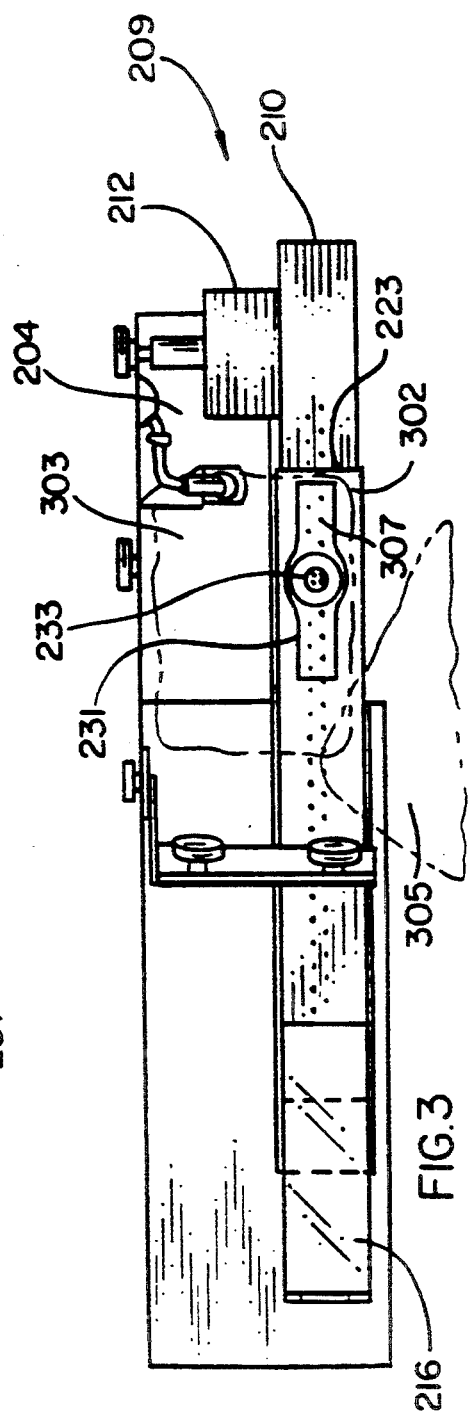

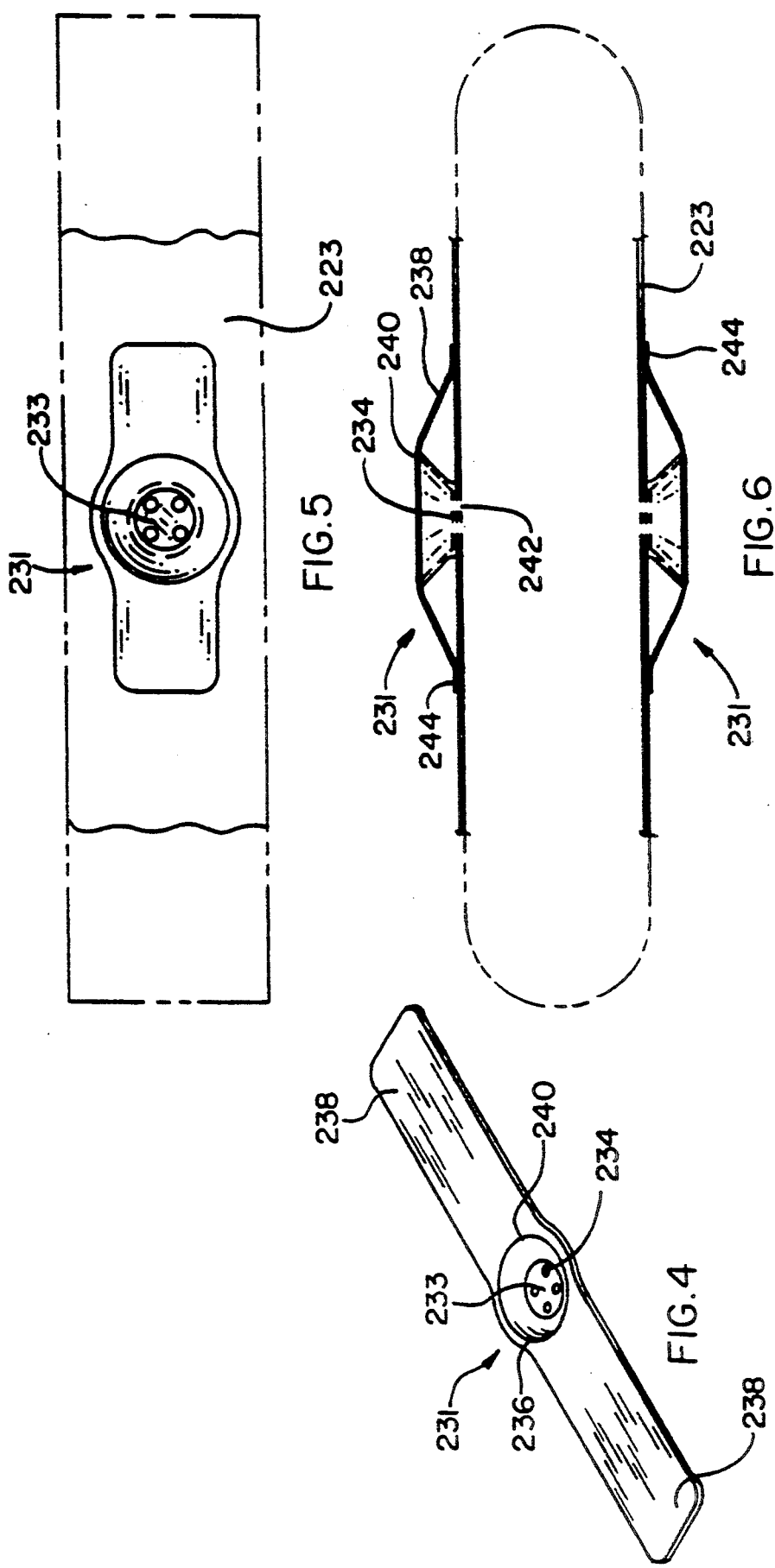

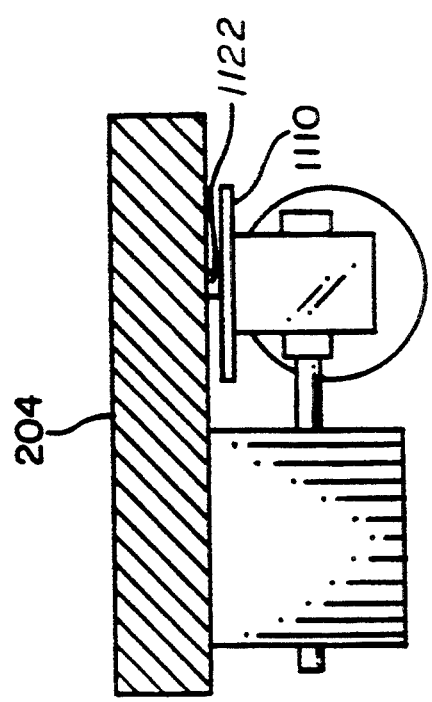
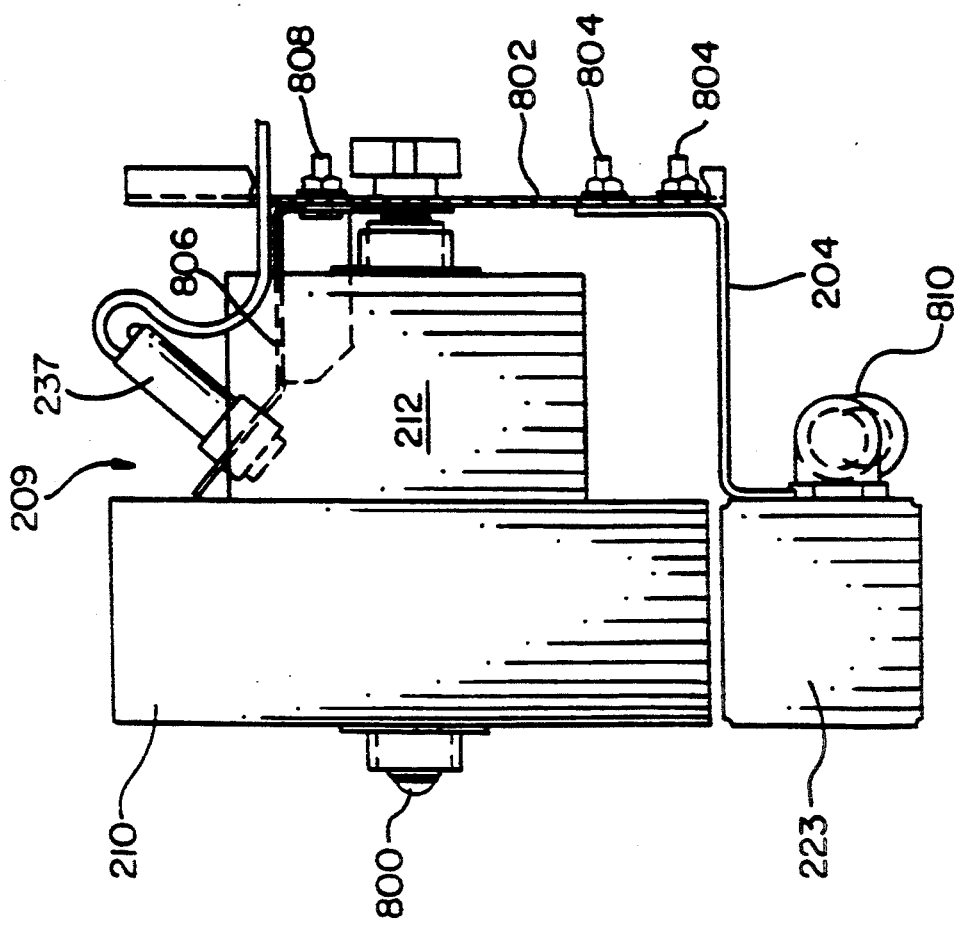

VACUUM BEAM PRODUCT DISPENSER AND SINGULATOR AND METHOD FOR SINGULATING PRODUCTS

This is a continuation of application Ser. No. 08/002,664, filed Jan. 29, 1993, now U.S. Pat. No. 5,326,219.

FIELD OF THE INVENTION

The field to which the invention pertains is product dispensers for automatic order dispensing systems.

BACKGROUND OF THE INVENTION

Some distribution centers are designed to supply less than case lot quantities of a large variety of products to a number of different customers. The process of assembling orders for less than case lot quantities of products is generally referred to as "broken case order picking." These centers sometimes invest in automated order dispenser systems (AOS) to reduce cost and errors associated with broken case order picking.

A typical AOS is comprised of a central conveyor and a plurality of product dispensers mounted on either side of the conveyor. Each product dispenser is loaded with a particular product. A central controller causes the necessary dispensers to place on the central conveyor the correct quantity of the particular products required to fill the order. At the end of the conveyor, the products are packaged for delivery to the customer.

AOS have been used in the past mostly for products that are prepackaged in containers having a relatively fixed or immutable shape or geometry, such as, for example, products packaged in rectangular cardboard boxes. Product dispensers for products with a fixed geometry are relatively simple to manufacture and to operate reliably. Typically, products are dispensed from a channel in which they are stacked vertically. A pneumatically-operated piston or synchronized cog pushes the product through an opening at one end of the cartridge just big enough for one box. In this manner, the product dispenser is said to "singulate" the stacked products into a product stream for single dispensing.

AOS generally have not been used to dispense so-called "soft" products because prior art product dispensers are not capable of reliably singulating them. Soft products have, to some degree, mutable geometries. Soft products might include, for example, shirts, dresses, underwear and the like, either unpackaged or packaged in flexible plastic wrapping. Prior art product dispensers typically utilize "aggressive" stripping techniques to singulate or prevent more than one product from being dispensed at a time. One example of such a system is the product dispenser previously described having an opening just large enough for the boxed product to pass through. Though the aggressive stripper works well with boxed or rigid products, soft products can easily "clog" or "jam" the opening in the channel. If the opening is made large enough to reduce significantly the possibility of clogging, friction between products may cause more than one product to be pushed out of the channel. These extra products are termed in the art "random multiples". This loss of control of the number of products dispensed is usually intolerable for a system that is designed to reduce errors in filling orders and to increase efficiency. A dispenser for soft products must provide the necessary product singulation.

Previously issued U.S. Pat. No. 5,064,361 provided solutions to many of these problems. However, additional improvements to this apparatus will provide improved vacuum control of products removed from a product stack and improved means for preventing random multiples within a product stream. Also the design of the hopper or cartridge mechanisms of this apparatus causes problems with the removal of the bottom product from the product stack.

BRIEF SUMMARY OF THE INVENTION

Singulation for soft products is achieved according to the present invention by utilizing a "vacuum beam" product dispenser and singulator that minimizes random multiples from the dispenser's product stream. A relatively narrow conveyor on an inclined ramp has a low friction surface and includes a suction cup carrier pad with a vacuum control element to pick a product from the bottom of a stack of products in a product hopper. The product hopper having a bottom slot, a front opening, and a hopper shield for controlling the pickup point of the suction cup carrier pad, is non-orthogonally placed above the input end of the conveyor such that the stack of products overlays the input end of the inclined ramp and extends one edge of the product stack over the conveyor so both the picked product and any random multiple are pulled "off-center" and not balanced on the conveyor and inclined ramp. The products tend to slide and fall off the edge of the ramp due to their inertia and a lateral inclination of the ramp. The vacuum control element, though, holds the picked product on the conveyor, while random multiples that are pulled out of the hopper with the picked product fall off of the ramp into a collection bin. The random multiples are collected and then recirculated to the product hopper.

Although many of the inherent advantages of such a system will be recognized from the proceeding description, one important advantage is its low cost and simplicity, permitting many product dispensers to be utilized in an AOS.

BRIEF DESCRIPTION OF THE DRAWINGS

FIG. 2 is a cross-sectional side view of a vacuum beam product dispenser;

FIG. 3 is a top view of the vacuum beam product dispenser;

FIG. 4 is a perspective drawing of the suction cup carrier pad;

FIG. 5 is a top view of the suction cup carrier pad connected to the conveyor belt;

FIG. 6 is a side view of the suction cup carrier pad connected to the conveyor belt;

FIG. 8 is an end view of the product singulator illustrating the pinch roller pair;

FIG. 12 is an end view of the drive roller and the drive motor.

DETAILED DESCRIPTION OF THE DRAWINGS

Figure 1:
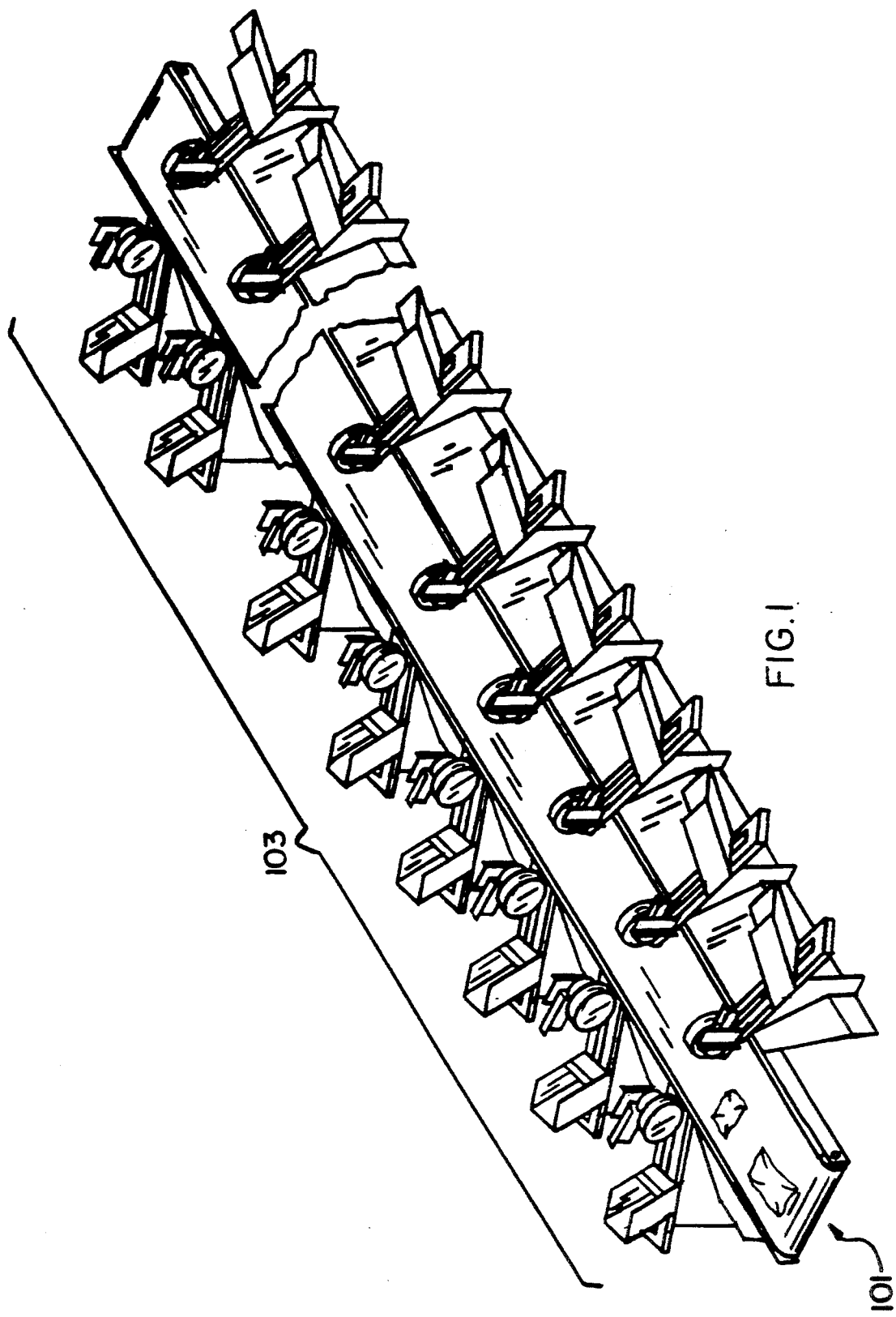
FIG. 1 is an illustration of an automatic order dispensing system.

Referring now to FIG. 1, an automated order dispensing system (AOS) is comprised of a central conveyor 101 that is flanked on either side by a plurality of product dispensers 103. Each product dispenser dispenses one type of product. An order for prescribed quantities of certain products is received by an AOS central controller (not shown) of the AOS. The central controller issues control commands to certain product dispensers to dispense the necessary quantity of selected products onto the central conveyor 101. The dispensed products that fill the order reach the end of the central conveyor at approximately the same time or in a consecutive sequence and are packaged for shipment.

Referring now to FIGS. 2 and 3, a vacuum beam product dispenser and singulator 201 for an AOS is comprised of a product hopper 203, in which are stacked the products 205 to be dispensed, vacuum beam 207, and a compressible pinch roller pair 209, comprised of a large diameter roller 210 and a small diameter roller 212. The conveyor belt 223 is relatively narrow, with one edge positioned along the edge of the vacuum manifold 221 and ramp 204. The product hopper 203 is placed over the ramp 204 and conveyor belt 223 such that the product stack 205 is non-orthogonal to the ramp. An opening 215 defined by the stripper plate 219 is at least large enough to pass the bottom product 217 and preferably large enough to insure that products will not jam or block the opening during operation of the product dispenser. A passive stripper 219 of a flexible plastic or rubber material assists in minimizing random multiple products from passing through the opening 215. A hopper shield 216 mounted on the top of ramp 204 controls the point the suction cup carrier pad 231 engages the product stack. The hopper shield 216 prevents the top edge of the suction cup carrier pad 231 from contacting the product stack 205 until the carrier pad passes beyond the hopper shield. In this manner, the point at which vacuum control of the bottom product 217 in a product stack 205 occurs is controlled by the hopper shield 216.

Vacuum beam 207 is comprised of a vacuum manifold 221, conveyor belt 223, drive roller 225 and idler roller 227. A motor drives roller 225, which, in turn, drives the conveyor belt 223. The vacuum manifold 221 is coupled to a high flow vacuum source, not shown, through port 229. Several vacuum beam product dispensers and singulators share a common vacuum source.

Conveyor belt 223 has a low friction surface, except for two suction cup carrier pads 231 spaced equidistant from each other along the surface of the conveyor belt. The surface of each pad is raised from the surface of the conveyor belt. The suction cup carrier pad 231 assists in dislodging the product 217 on the bottom of the product stack 205.

Referring also to FIG. 4 there is shown one embodiment of the suction cup carrier pad 231. The carrier pad 231 has a circular vacuum control element 233 having four holes 234 passing through the surface of the vacuum control element. A conical surface 236 connects the vacuum control element 233 with two rectangular strips 238 extending in opposite directions from the top edge 240 of the conical surface. The carrier pad 231 is constructed of a flexible material such as EPDM or any other elastomer material.

FIGS. 5 and 6 illustrate how the suction cup carrier pad 231 attaches to the conveyor belt 223. The vacuum control element 233 is attached by glue or some other bonding agent to the surface of the conveyor belt 223. The holes 234 in the vacuum control element 233 match up with a similar set of holes 242 in the conveyor belt 223. The carrier pad 231 is further connected to the conveyor belt 223 by the ends 244 of rectangular strips 238. Most of the surface area of the rectangular strips 238 are not connected to the surface of the conveyor belt 223 to allow a flexing action of carrier pad 231.

Figure 7A:
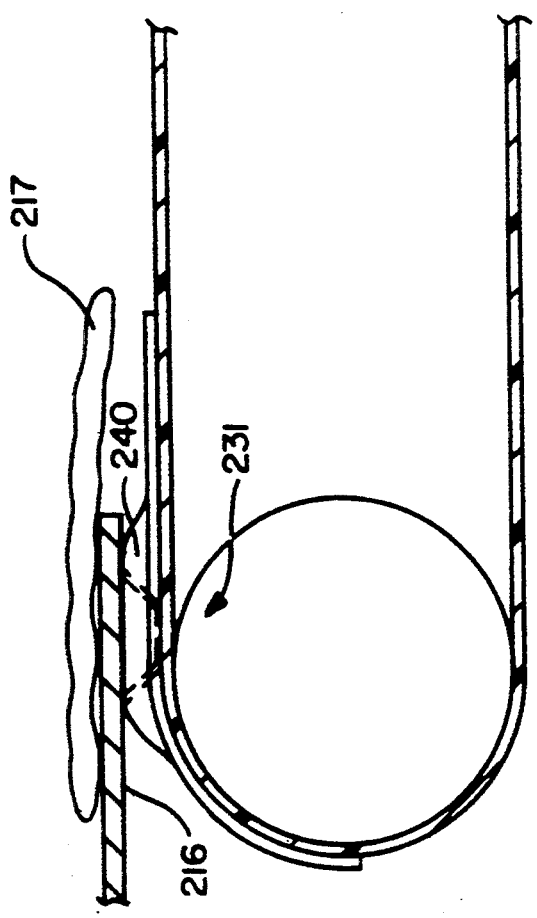
FIGS. 7a, 7b and 7c illustrate the flexing action of the suction cup carrier pad as it passes around the drive roller and under the hopper shield.
Figure 7B:
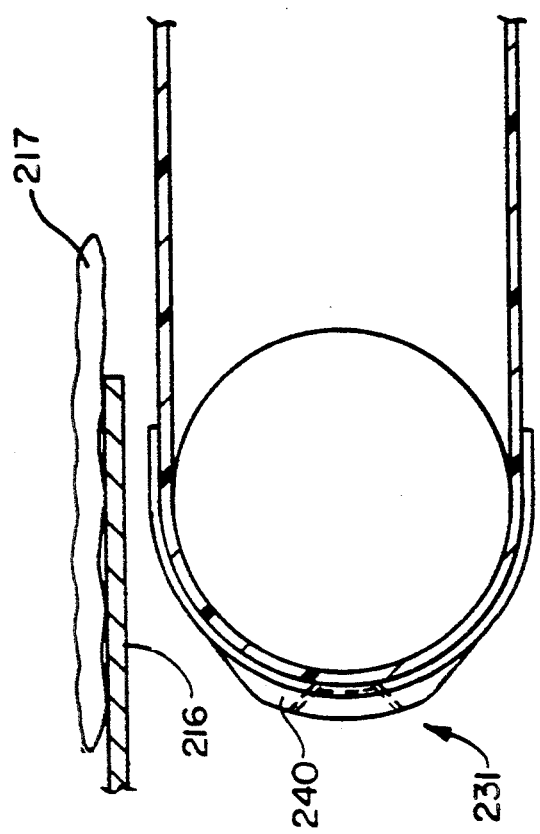
Figure 7C:
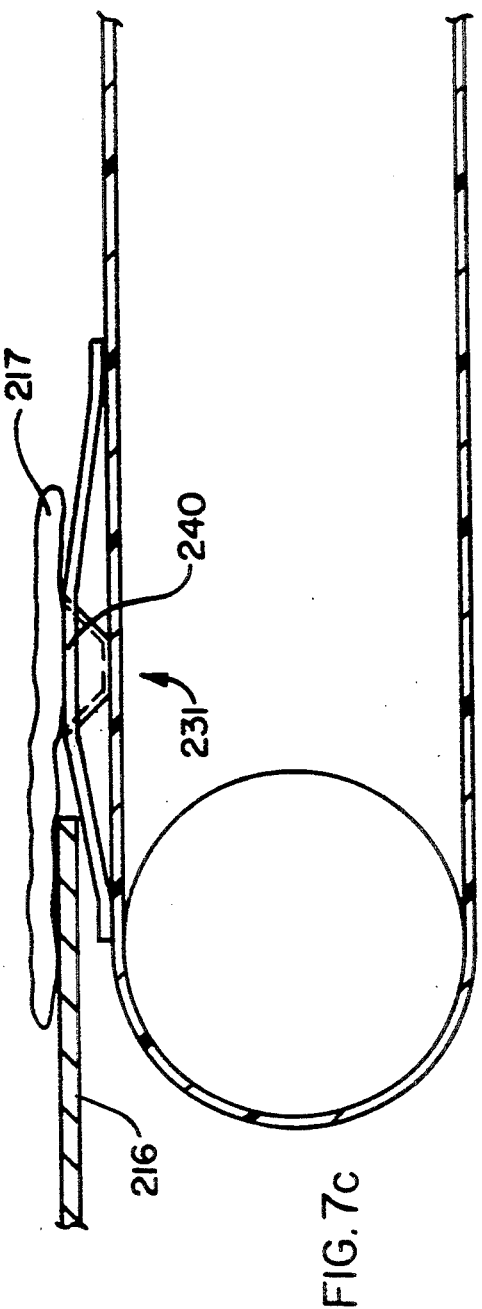

FIGS. 7a, 7b and 7c illustrate the flexing action of the carrier pad 231 as the pad passes around the drive roller 225 and under the hopper shield 216. The flexible nature of the carrier pad 233 allows the top edge 240 of the conical surface 236 to flex downward towards the surface of the conveyor belt 223 as the carrier pad passes around the rollers 225 and 227 at each end of the vacuum beam 207 as shown in FIG. 7a. When the carrier pad 233 passes from the drive roller 225 under the hopper shield 216, the top edge 240 remains flexed downward as shown in FIG. 7b due to the downward force applied by the hopper shield 216. As the carrier pad 233 passes from under the surface of the hopper shield 216, the top edge 240 of the conical surface 236 flexes back upward to a normal position as illustrated in FIG. 7c. When the carrier pad 231 flexes back to the normal position under the product stack 205, the flexing action provides a "kick" or "jolt" to the bottom product 217 of the product stack and facilitates vacuum control and singulation of the bottom product. A product under vacuum control acts as a vacuum seal or valve to prevent flow through the vacuum control element.

Referring back to FIGS. 2 and 3, the conveyor belt 223 is inclined at an angle of between approximately twenty degrees and up to ninety degrees to the surface of the central conveyor 101. The conveyor belt 223 is also laterally inclined at an angle of approximately 30 degrees. For purposes of description the lateral inclination is not illustrated in FIGS. 2 and 3. Also, the product hopper 203 is inclined at an angle from the surface of the conveyor belt 223 to prevent binding of the bottom product by the weight of the product stack. Products not under vacuum control will slip off conveyor belt 223 and ramp 204 due to their inertia and the low friction surfaces of the belt and ramp. The angles of inclination for a particular application are determined by the product, taking into consideration the weight and friction of the product package. Products with surfaces having a higher friction or a smaller weight require greater angles of inclination.

A product under vacuum control is conveyed up to a pair of rotatable, compressible foam pinch rollers 209 illustrated in FIG. 8. The pair of pinch rollers 209 consists of a large diameter pinch roller 210 and a small diameter pinch roller 212 each having the same axis of rotation. The large diameter roller 210 covers the area from substantially the center of the ramp 204 to the edge of the ramp containing the conveyor belt 223. The small diameter roller 212 runs substantially from the center of the ramp 204 to the edge opposite the conveyor belt 223. The purpose of using rollers of two separate diameters is to prevent skewing of the singulated product and promote singulation of a product onto a central conveyor in a desired orientation. The use of a single roller can cause that side of the product as it moves from the conveyor belt, to exit from the pinch roller at a faster rate than that side that was not under control of the conveyor belt, thus causing removal of the product from the desired orientation. A roller of smaller diameter on the product edge not under control of the conveyor belt rotates with the larger diameter roller and prevents movement of the product from a proper orientation.

Random multiples slide off the conveyor belt 223 before reaching the pinch rollers 209 due to the lateral inclination of the belt. The presence of a product driven under vacuum control to the pinch rollers 209, is sensed by a photoelectric cell 237. The photoelectric cell 237 causes the conveyor belt 223 to stop at a point at which the product is under the control of the pinch rollers 209. The product is then poised to be dispensed onto the central conveyor (101 in FIG. 1). When the product is to be delivered onto the central conveyor, the conveyor belt 223 is activated by the AOS central controller so that the product is deposited onto the central conveyor belt. The vacuum beam conveyor belt 223 continues to be driven until another product is placed under control of the pinch roller 209 and sensed by the photoelectric cell 237.

Alternatively, the product may be driven from the conveyor belt 223 by the large diameter pinch roller 210 and the conveyor belt 223 in combination. The large diameter pinch roller 210 is then driven by a motor (not shown) or some other type of drive means responsive to the photoelectric cell 237. The use of the large diameter pinch roller 210 as a drive roller is only utilized with products having a thickness greater than approximately 2.50 inches, a wide body and a heavyweight.

The large diameter pinch roller 210 and small diameter pinch roller 212 are mounted on a shaft 800 inserted through roller bracket 802. The roller bracket 802 is mounted to the ramp 204 by a pair of bolts 804. The photoelectric cell 237 is mounted on an elbow bracket 806 connected to the roller bracket 802 by a bolt 808. Also shown in FIG. 8 is conduit 810 which connects the vacuum beam below conveyor belt 223 to a vacuum source.

Referring now only to FIG. 3, vacuum manifold 221 includes a plurality of staggered holes 307 defined in a longitudinal direction along its upper surface. Conveyor belt 223 forms a moving seal over the holes 307 to help maintain the high flow vacuum within the vacuum manifold 221. Vacuum control originates from vacuum control element 233 only while one of the four holes in the element is positioned over one of the staggered holes 307. Vacuum control is thus provided from the product hopper 203 to pinch rollers 209 as the suction cup carrier pad 231 moves with the conveyor belt 223. Because the vacuum in the manifold 221 has high flow capacity, the product 303 need not make a perfect seal over vacuum control element 233. The use of staggered holes 307 allows greater vacuum control of a product with a lower flow capacity.

Figure 9:
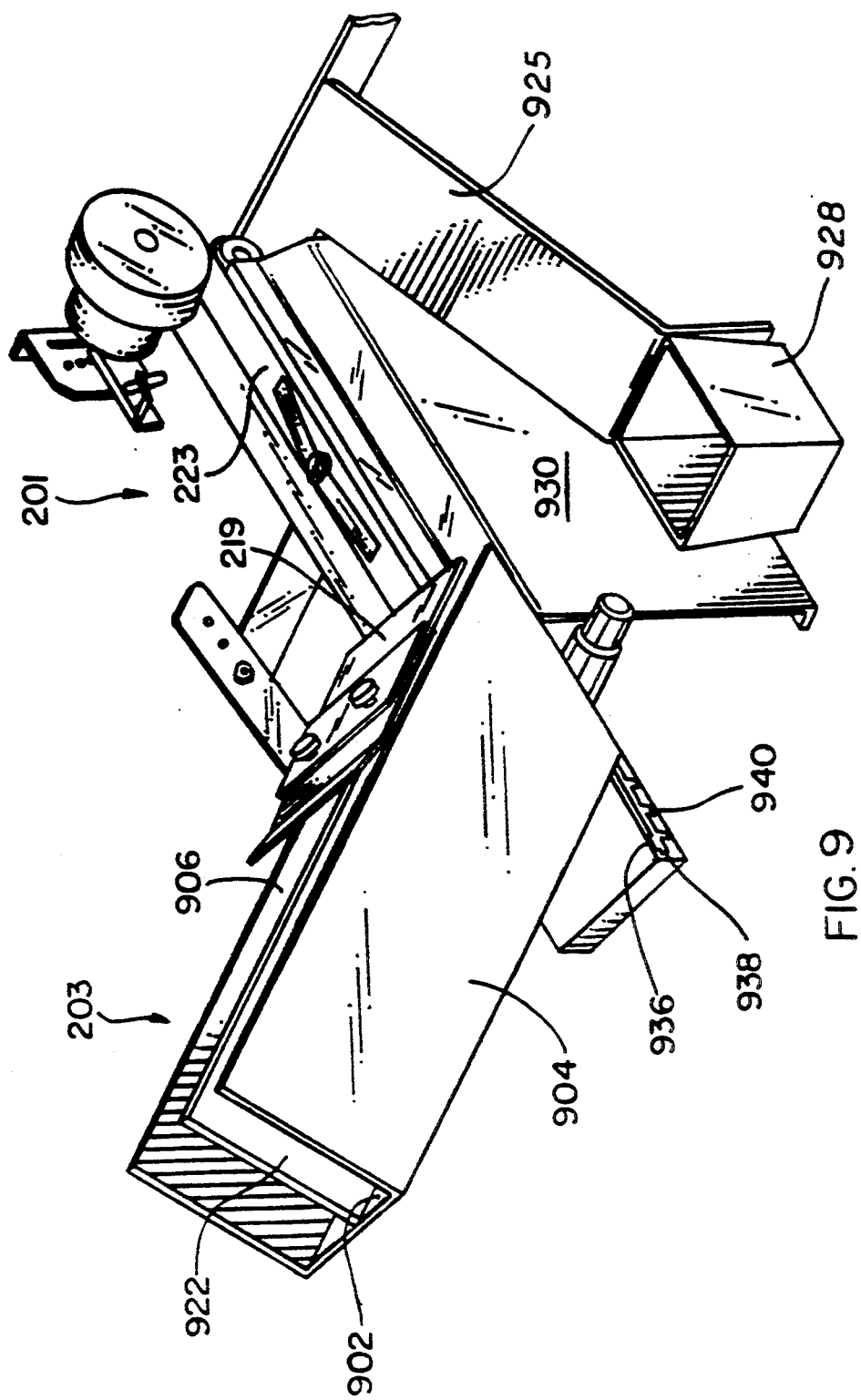
FIG. 9 is a perspective drawing of the vacuum beam product dispenser.
Figure 10:
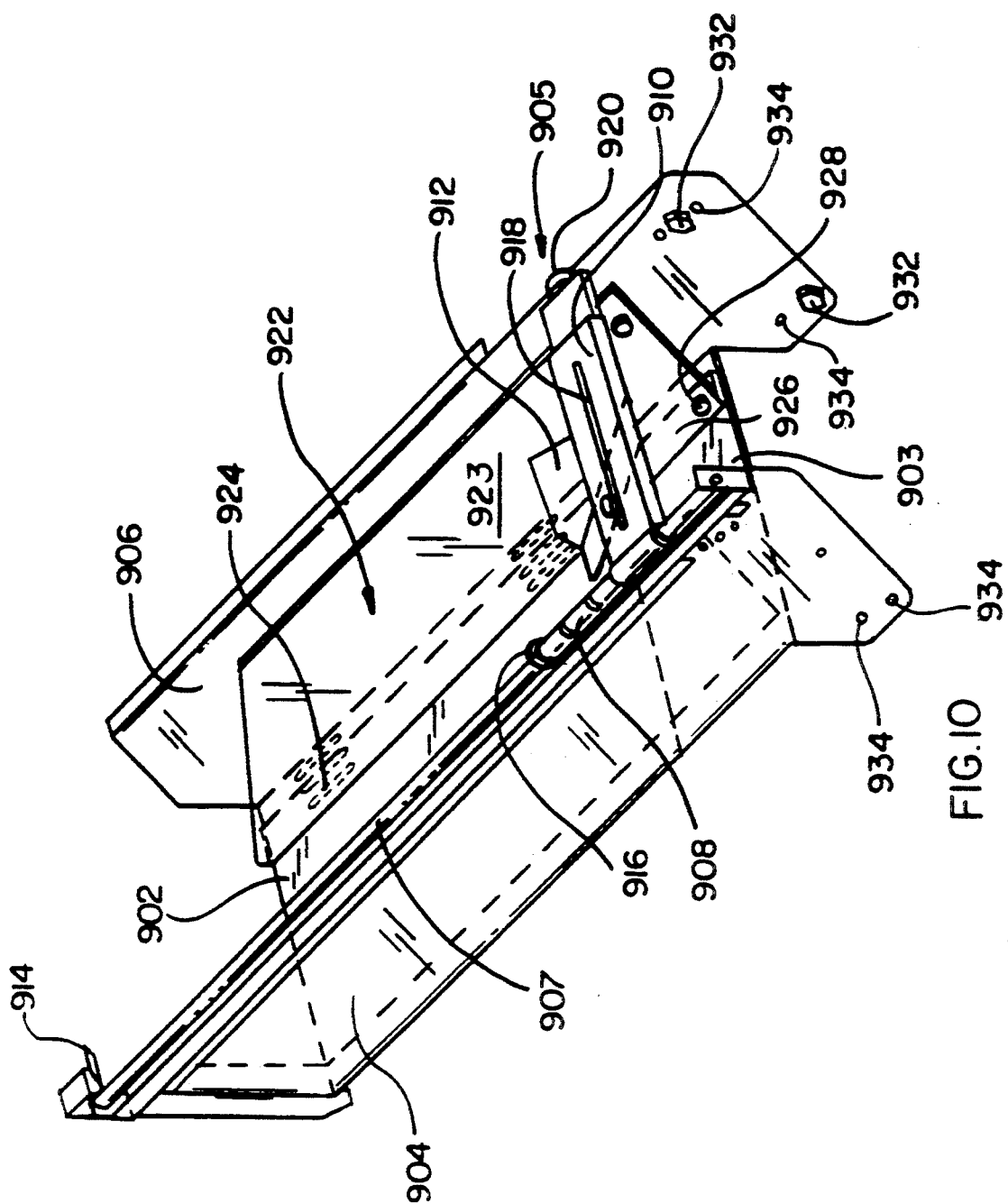
FIG. 10 is a perspective view of the product hopper.

Referring now to FIGS. 9 and 10, there is a perspective view of the product singulator 201 and product hopper 203 and a perspective view of the product hopper 203. The product hopper 203 consists of a back plate 902, adjustable bottom plate 903, and opposing side plates 904 and 906 forming a chute to contain the product stack. The adjustable bottom plate 903 may be raised or lowered to a position required by the angle of the product hopper 203 with respect to the conveyor belt 223.

A paddle assembly 905 allows a constant pressure to be applied to the top of a product stack. Along the top edge of side panel 904 runs a rail 907. The rail 907 acts as a guide for paddle sleeve 908. Paddle bracket 910 attaches the paddle sleeve 908 to a paddle 912. The purpose of paddle 912 is to provide a constant pressure to the top of the product stack. The paddle sleeve 908 slides to the input end of rail 907 and is held in place by a clip 914 fastened over ridge 916 as products are loaded into the hopper 203. When the clip 914 is released the paddle assembly 905 will slide down the rail 907 as products are removed from the product stack due to gravity. The paddle bracket 910 also includes a slot 918 allowing adjustment of the paddle position to the center of the product stack. Movement of the paddle bracket 910 along side plate 906 is facilitated by a roller 920.

A divider plate 922 is inserted into one of a number of slots 924 within the back plate 902. The divider plate 922 consists of a dividing wall 923 and flange 926. A magnetic strip 928 runs along the bottom of the flange 926 to promote a better connection between the divider plate 922 and the back plate 902. The slots 924 allow the divider plate 922 to be placed in a variety of positions depending on the width of the product being singulated.

The product hopper 203 is connected to the ramp frame 930 by four mounting studs 932. Two of the studs 932 are placed on each side of the product hopper 203 along the bottom edges of the side plates 904 and 906 as shown in FIG. 10. The mounting studs may be placed in one of a number of mounting holes 934 that allow the angle of the product hopper 203 in relation to the conveyor belt 223 to be adjusted as required. The mounting studs 932 pass through opening 936 of ratchet channel 938. The studs 932 rest in the ratchet slots 940 extending along the length of ratchet channel 938. The number of slots 940 provide the flexibility of positioning the product hopper 203 in a number of locations depending on the length of the product to be singulated.

Referring now also to FIG. 3, the center of conveyor belt 223 is not centered between the sides of product hopper 203, but to one side of the center of the hopper. Preferably, the edge 302 of the conveyor belt 223 is to one side of the center of gravity of the products in the stack of products 205. Products pulled from the hopper 203 are not necessarily balanced on the ramp 204 and as a result the center of gravity is not supported by the vacuum beam. As a result of this configuration and the lateral inclination of the ramp 204, only products under vacuum control will remain on the conveyor belt 223 long enough to be driven to pinch rollers 209. Random multiples pulled from the hopper 203 at the same time as the product under vacuum control drop off to one side of the conveyor belt 223 before reaching the pinch rollers 209.

Vacuum beam 207 is supported by a ramp frame 930. In combination with slide 925, the frame 930 directs random multiples that fall off of the conveyor belt 223 into a multiples tote 928. In operation, the multiples tote 928 is periodically checked and the multiples collected to be redispensed.

Figure 11:
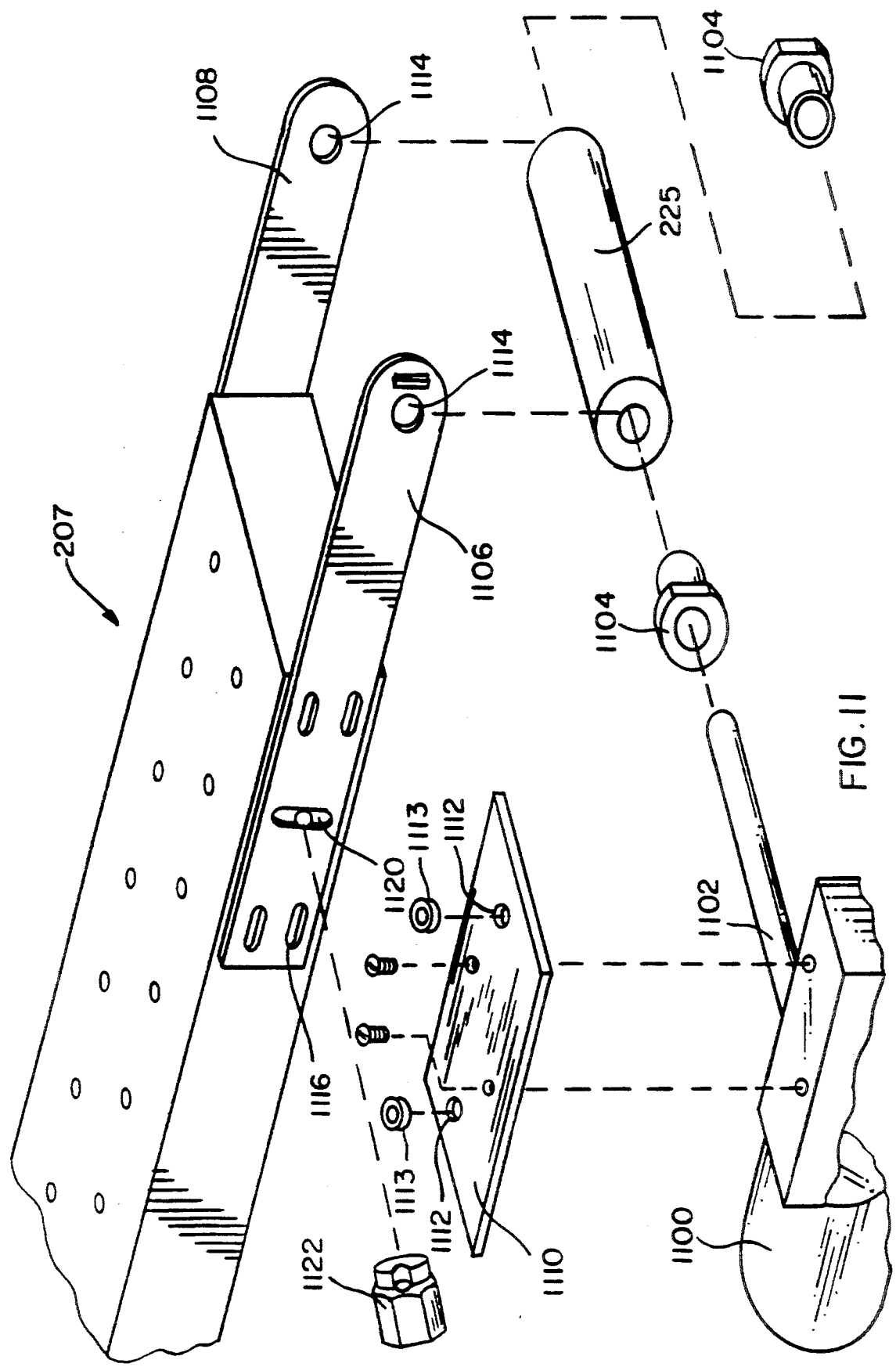
FIG. 11 is an exploded perspective drawing of the drive roller end of the vacuum beam.

Referring now to FIG. 11, there is shown an exploded perspective view of a section of the vacuum beam 207 and drive roller 225. An electric motor 1100 drives the conveyor belt 223 in the direction of the pinch rollers 209. The electric motor 1100 includes a drive shaft 1102 extending through the conveyor belt drive roller 225. The drive shaft 1102 is inserted through a pair of bushings 1104 located in mounting brackets 1106 and 1108. Positioned over the top of the electric motor 1100 is a stopper plate 1110. The stopper plate 1110 is a rectangularly shaped plate having two holes 1112 near each end of the plate. Within the holes 1112 are inserted two elastomer bumpers 1113. The stopper plate 1110 prevents the electric motor 1100 from rotating with the drive shaft 1102 when the motor is engaged. The rotation is prevented by the stopper plate 1110 which is located below the surface of ramp 204 as illustrated in FIG. 12.

The mounting brackets 1106 and 1108 are two substantially rectangular plates mounted on the input end of vacuum beam 207. Each bracket has a shaft hole 1114 wherein the bushings 1104, discussed above, are mounted. Four oblong mounting holes 1116 allow attachment of the mounting brackets 1106 and 1108 to the vacuum beam 207. Adjustable mounting bracket 1106 also contains an adjustment slot 1120 for adjusting the position of the bracket. An eccentric 1122 is rotatably attached to the vacuum beam 207 through the adjustment slot 1120. The eccentric 1122 is rotated to adjust the positioning of the adjustable mounting bracket 1106 to position the roller 225 for aligned rotation of the conveyor belt 223.

While the invention has been described in connection with a preferred embodiment, it is not intended to limit the scope of the invention to the particular form set forth, but, on the contrary, it is intended to cover alternatives, modifications, equivalents as may be included within the spirit and scope of the invention as defined in the appended claims.

I claim:

1. A vacuum beam product singulator comprising:
   a selectively controlled longitudinally and laterally inclined conveyor belt having an adjustable drive roller and an adjustable idler roller, said conveyor belt further having an upstream input and a downstream output end;
   a vacuum control element mounted at the surface of said conveyor belt for picking a bottom product from a stack of products and holding the picked product under vacuum control to the surface of the inclined conveyor belt during movement toward the downstream output end;
   means connected to said vacuum control element for generating a vacuum through the vacuum control element to establish a vacuum force between the picked product and the conveyor belt; and
   means for positioning a product stack at the input end of the inclined conveyor belt, the picked product falling from the conveyor belt unless held to the conveyor belt by the vacuum control element.

2. The vacuum beam product singulator of claim 1 wherein the vacuum control element comprises a compressible carrier pad positioned on the conveyor belt for picking the bottom product of the product stack.

3. The vacuum beam product singulator of claim 1 wherein the vacuum control element comprises a suction cup carrier pad positioned on the conveyor belt for picking the bottom product of the product stack, said carrier pad having a top edge that flexes downward as the carrier pad passes around the drive roller and returns to a normal position after passing the drive roller.

4. The vacuum beam product singulator of claim 1 wherein said means for generating a vacuum comprises a vacuum manifold underlying the conveyor belt and having a plurality of staggered holes along an upper surface of the manifold, the vacuum manifold coupled to a vacuum source.

5. The vacuum beam product singulator of claim 1 further comprising a pair of pinch rollers mounted at the downstream output end of the conveyor belt for placing a picked product under pinch control, said pinch rollers comprising:
   a large diameter pinch roller positioned over the conveyor belt; and
   a small diameter pinch roller juxtapositioned to the large diameter pinch roller.

6. The vacuum beam product singulator of claim 1 wherein the means for positioning comprises a detachable product hopper having an input and an output end, said product hopper adjustable to a plurality of positions along the input end of the conveyor belt.

7. The vacuum beam product singulator of claim 6 wherein the detachable product hopper further comprises a hopper shield mounted on the output end of the hopper to control the establishment of the vacuum force to the picked product.

8. The vacuum beam product singulator of claim 6 wherein the detachable product hopper is adjustable to receive a variety of product sizes.

9. The vacuum beam product singulator of claim 1 wherein the adjustable drive roller comprises:
   a fixed mounting bracket for supporting one end of the drive roller;
   an adjustable mounting bracket for supporting the opposite end of the drive roller; and
   an eccentric for adjusting the position of the adjustable mounting bracket to facilitate rotation of the conveyor belt about the drive roller.

10. The vacuum beam product singulator of claim 9 further comprising:
    power means for actuating a drive shaft supporting the adjustable drive roller;
    a pair of bushings, one mounted on the fixed mounting bracket and the second on the adjustable mounting bracket respectively, for holding the drive shaft; and
    a stopper plate, mounted to control the position of said power means, for preventing rotation of the power means about the drive shaft.

11. A vacuum beam product singulator comprising:
    a selectively controlled longitudinally and laterally inclined conveyor belt having an upstream input and a downstream output end;
    a suction cup carrier pad mounted at the surface of said conveyor belt for picking a bottom product from a stack of products and holding the picked product under vacuum control to the surface of the inclined conveyor belt during movement toward the downstream output end, said carrier pad having a top edge that flexes downward as the carrier pad passes around a roller and returns to a normal position after passing the roller;
    means connected to the suction cup carrier pad for generating a vacuum through the suction cup carrier pad to establish a vacuum force between the picked product and the conveyor belt; and
    means for positioning a product stack at the input end of the inclined conveyor belt, the picked product falling from the conveyor belt unless held by the suction cup carrier pad to the conveyor belt.

12. The vacuum beam product singulator of claim 11 further comprising a pair of pinch rollers mounted at the downstream output end of the conveyor belt for placing a picked product under pinch control, said pinch rollers comprising;
- a large diameter pinch roller positioned above the conveyor belt, and
- a small diameter pinch roller juxtapositioned to the large diameter pinch roller.

13. The vacuum beam product singulator of claim 11 wherein the means for positioning comprises a detachable product hopper having an input and an output end, said product hopper adjustable to a plurality of positions along the input end of the conveyor belt.

14. The vacuum beam product singulator of claim 13 wherein the detachable product hopper further comprises a hopper shield mounted on the output end of the hopper to control the establishment of the vacuum force to the picked product.

15. The vacuum beam product singulator of claim 13 wherein the detachable product hopper is adjustable to receive a variety of product sizes.

16. The vacuum beam product singulator of claim 11 wherein said means for generating comprises a vacuum manifold underlying the conveyor belt and having a plurality of staggered holes along an upper surface of the manifold, the vacuum manifold coupled to a vacuum source.

17. A vacuum beam product singulator comprising:
- a selectively controlled longitudinally and laterally inclined conveyor belt having an upstream input and a downstream output end;
- a vacuum control element mounted at the surface of said conveyor belt for picking a bottom product from a stack of products and holding the picked product under vacuum control to the surface of the inclined conveyor belt during movement toward the downstream output end;
- means connected to said vacuum control element for generating a vacuum through the vacuum control element to establish a vacuum force between the picked product and the conveyor belt; and
- a detachable product hopper, having an input end and an output end, for positioning a product stack at the input end of the conveyor belt, said product hopper adjustable to a plurality of positions along the input end of the conveyor belt.

18. The vacuum beam product singulator of claim 17 further comprising a pair of pinch rollers mounted at the downstream output end of the conveyor belt for placing a picked product under pinch control, said pinch rollers comprising;
- a large diameter pinch roller positioned above the conveyor belt, and
- a small diameter pinch roller juxtapositioned to the large diameter pinch roller.

19. The vacuum beam product singulator of claim 17 wherein said means for generating a vacuum comprises a vacuum manifold underlying the conveyor belt and having a plurality of staggered holes along an upper surface of the manifold, the vacuum manifold coupled to a vacuum source.

20. The vacuum beam product singulator of claim 17 further including a hopper shield mounted on the output end of the product hopper to control the establishment of the vacuum force to the picked product.

21. The vacuum beam product singulation of claim 17 wherein the detachable product hopper is adjustable to receive a variety of product sizes.

* * * * *

UNITED STATES PATENT AND TRADEMARK OFFICE
CERTIFICATE OF CORRECTION

PATENT NO. : 5,407,317
DATED : April 18, 1995
INVENTOR(S) : James M. Pippin, et al.

It is certified that error appears in the above-indentified patent and that said Letters Patent is hereby corrected as shown below:

Column 10, line 31, "singulation" should be --singulator--.

Signed and Sealed this

Nineteenth Day of December, 1995

Attest:

BRUCE LEHMAN

Attesting Officer

Commissioner of Patents and Trademarks